United States Patent
Brobst et al.

(10) Patent No.: US 7,167,873 B2
(45) Date of Patent: Jan. 23, 2007

(54) VISUAL-MODELING TECHNIQUE FOR USE IN IMPLEMENTING A DATABASE SYSTEM

(75) Inventors: Stephen A. Brobst, Sparks, NV (US); Ojustwin Naik, Dayton, OH (US); Edwina R. Redd, Cleveland Heights, OH (US)

(73) Assignee: NCR Corp., Dayton, OH (US)

( * ) Notice: Subject to any disclaimer, the term of this patent is extended or adjusted under 35 U.S.C. 154(b) by 310 days.

(21) Appl. No.: 10/179,811

(22) Filed: Jun. 26, 2002

(65) Prior Publication Data

US 2003/0055837 A1 Mar. 20, 2003

Related U.S. Application Data

(60) Provisional application No. 60/300,967, filed on Jun. 26, 2001.

(51) Int. Cl.
*G06F 17/30* (2006.01)

(52) U.S. Cl. .................. 707/104.1; 707/101; 707/102; 707/103 R

(58) Field of Classification Search ............... 707/1–2, 707/102, 101, 103 R, 104.1; 717/101; 705/400
See application file for complete search history.

(56) References Cited

U.S. PATENT DOCUMENTS

| | | | | |
|---|---|---|---|---|
| 5,412,806 A * | 5/1995 | Du et al. ........................ 707/2 |
| 5,734,884 A * | 3/1998 | Eberhard et al. ............... 707/2 |
| 5,930,798 A * | 7/1999 | Lawler et al. ............... 707/102 |
| 6,052,693 A * | 4/2000 | Smith et al. .............. 707/104.1 |
| 6,397,202 B1 * | 5/2002 | Higgins et al. ................ 706/47 |
| 6,446,053 B1 * | 9/2002 | Elliott ......................... 705/400 |
| 6,604,110 B1 * | 8/2003 | Savage et al. .............. 707/102 |
| 6,633,878 B1 * | 10/2003 | Underwood ................. 707/100 |
| 6,678,693 B1 * | 1/2004 | Shiraishi ..................... 707/102 |
| 6,694,310 B1 * | 2/2004 | Yu et al. ......................... 707/4 |
| 6,701,514 B1 * | 3/2004 | Haswell et al. ............. 717/115 |
| 6,947,946 B1 * | 9/2005 | Nishikawa ................... 707/102 |
| 2002/0129001 A1 * | 9/2002 | Levkoff et al. ................. 707/1 |
| 2003/0018616 A1 * | 1/2003 | Wilbanks et al. ............... 707/2 |

* cited by examiner

*Primary Examiner*—Thuy N. Pardo
(74) *Attorney, Agent, or Firm*—John D. Cowart; Harden E. Stevens III

(57) ABSTRACT

An interactive visual-modeling tool helps a database architect implement a database system. The tool gathers information about data that will form the content of the database, gathers information about one or more applications that will access the database, and gathers information about one or more phases in which the database-implementation project will occur. The tool uses this information to create a model of relationships among the content, the applications, and the project phases and to calculate costs for the implementation project. The tool then presents the model and the calculated costs to a human user through a graphical display.

20 Claims, 5 Drawing Sheets

VISUAL-MODELING TECHNIQUE FOR USE IN IMPLEMENTING A DATABASE SYSTEM

REFERENCE TO RELATED APPLICATIONS

This application claims priority from U.S. Provisional Application No. 60/300,967, filed Jun. 26, 2001.

BACKGROUND

Large database systems, such as data warehouses used for decision-support and online analytical processing (OLAP) applications, are widespread among corporate information technology (IT) departments. Many companies use enterprise-wide data warehouses to store vast amounts of information on various subjects. The information usually comes from all areas of the company's business and often includes data about the company's operations, its transactions, and its customers. The information in these large database systems is organized physically in a manner that makes efficient use of the hardware and software resources that make up the database. The information is organized logically in a manner that allows the people running the business to understand the nature and content of the data. In general, each company uses one or more logical data models (LDMs) to define the logical relationships among the data stored in the database.

Building and populating a large database is an expensive and time-consuming process. In general, people who understand the logical structure of the database and the applications to be run against the database must prepare a strategy for loading data into the database and bringing the application online. Careful planning allows efficient use of the database resources, in most cases allowing the business to derive benefit from the database even while it is under construction. This type of planning, however, is very time intensive and involves vast amounts of labor by highly skilled personnel. Moreover, this type of planning also generates large amounts of paper, such as word-processing documents and spreadsheet tables that explain the relationships among the components of the database and recommend courses and schedules for bringing the database online.

SUMMARY

Described below is a visual-modeling tool and technique that allows a database architect or database manager to manipulate the various aspects of a database-implementation project—such as project phasing and application requirements—and interactively obtain feedback regarding project costs—such as storage and sourcing estimates. The modeling tool presents an interaction mechanism that is visual in nature and that allows iterative refinement of project phasing and design in an intuitive way.

The tool helps the database architect implement the database system by gathering information about data that will form the content of the database, gathering information about one or more applications that will access the database, and gathering information about one or more phases in which the database-implementation project will occur. The tool uses this information to create a model of relationships among the content, the applications, and the project phases and to calculate costs for the implementation project. The tool then presents the model and the calculated costs to a human user through a graphical display.

In some embodiments, the tool, in creating a model of relationships, creates a map that links the database content to the applications that rely on that content or a map that links applications to the project phases in which those applications are to be implemented. In calculating costs, the tool often calculates the amount of database resources needed to implement the database system, or calculates the amount of human resources needed to implement the database system, or calculates costs for each phase of the implementation project. In gathering information about the data that will form the content of the database, the tool derives information from a data model that defines a logical structure for the data in the database. Some versions of the tool also allow the database architect to modify the graphical display to effect changes in the implementation plan. In doing so, the tool revises the model of relationships among the content, applications, and phases in response to changes made by the user. The tool also recalculates costs for the implementation project in response to changes made by the user.

Other features and advantages will become apparent from the description and claims that follow.

DETAILED DESCRIPTION

Figure 1:
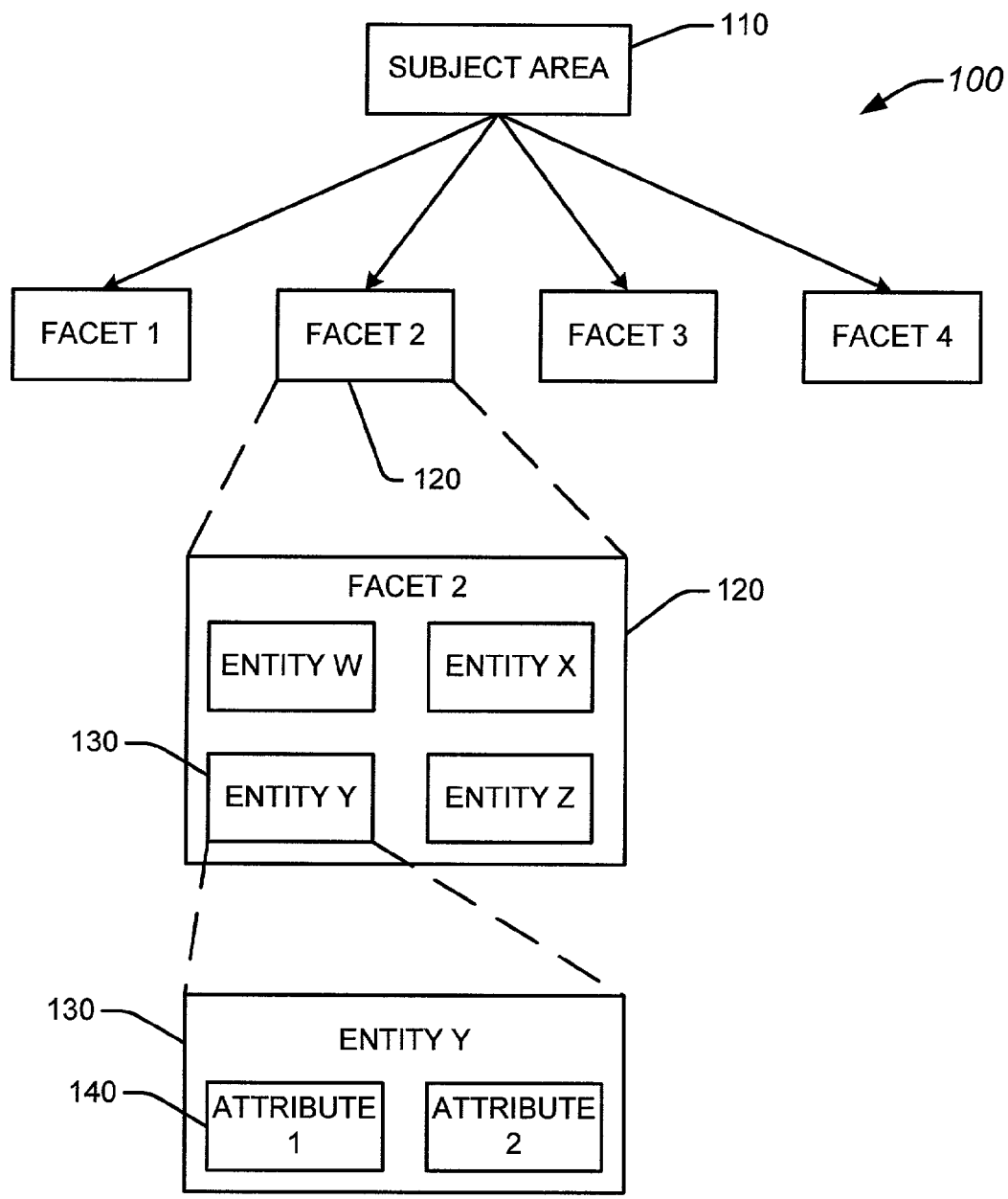
FIG. 1 is a diagram showing a hierarchical model that represents the logical relationships among data stored in a database system.

FIG. 1 shows an example of a hierarchical organization 100 of information content for a database system. At the highest level the data is organized into "Subject Areas" 110, which identify related collections of information within a logical data model (LDM) created for the database. A healthcare organization, for example, might organize its enterprise data into subject areas that include claims encounters, accounts, providers, products and producers. Within each subject area, data is organized into "Subject Area Facets" 120, which capture the major characteristics of the subject areas into which the company's data falls. In general, each facet includes one or more "Entities" 130, and each entity includes one or more "Attributes" 140. Database applications, such as online analytical processing (OLAP) applications running on client computer systems, manipulate the data in the database upon the logical structure defined by the logical data model.

Figure 2:
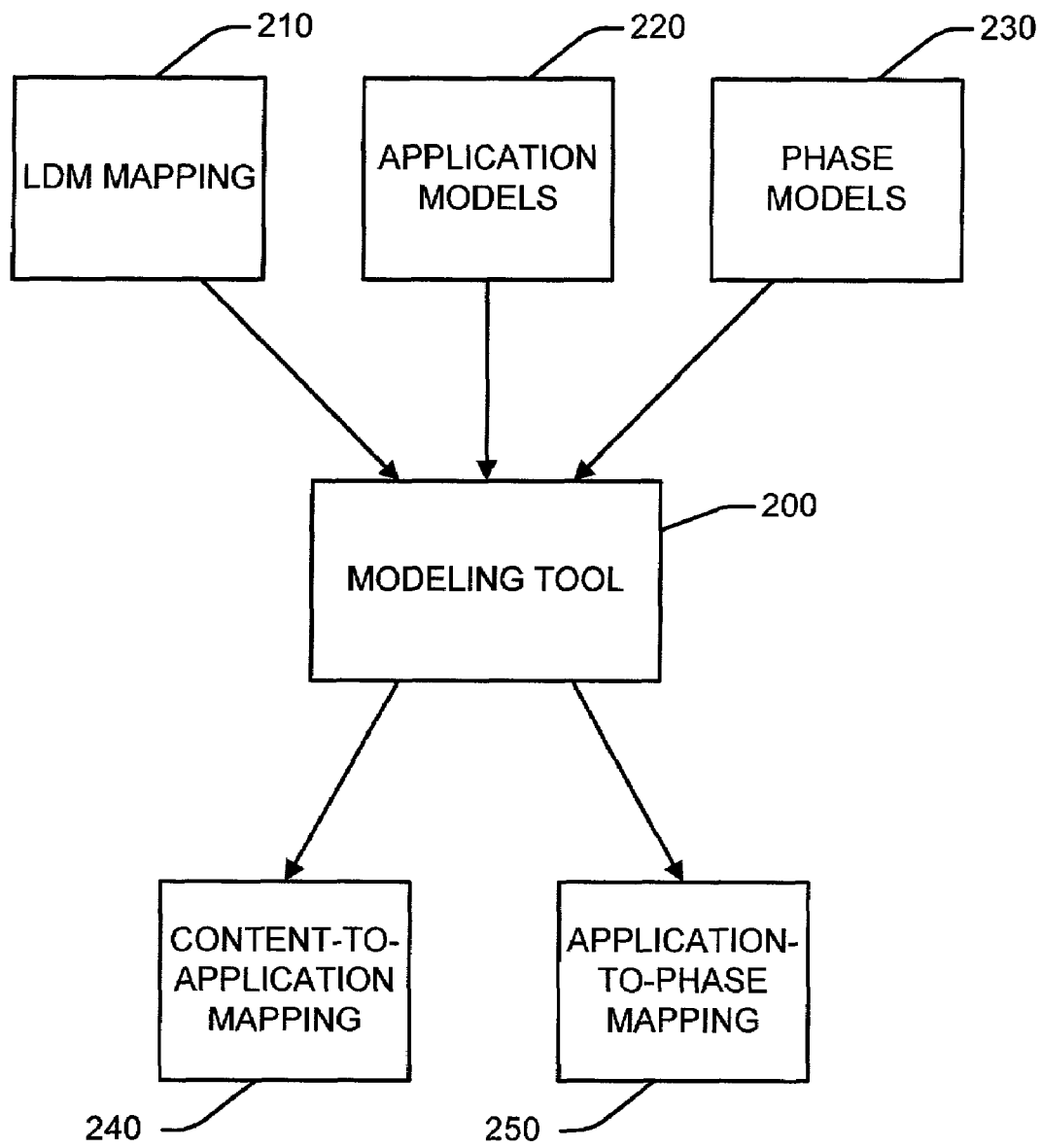
FIG. 2 is a block diagram showing a visual-modeling tool and several information sets serving as its I/O.

FIG. 2 is a diagram showing an interactive visual-modeling tool 200 that helps a database administrator (DBA), architect, or manager understand the relationships among data stored in the database and applications running against the database. The DBA uses the modeling tool in developing an implementation plan for the database and the applications that it supports. The modeling tool allows the DBA to manipulate various aspects of the implementation project and interactively obtain feedback on project costs.

The modeling tool 200 receives input from several information sets. One of these information sets 210 is a mapping of the logical data model chosen for the database into a hierarchical structure like that shown in FIG. 1. Mapping the LDM to the hierarchical model in this manner allows the DBA to view relationships among the data populating the database and the business applications relying on that data. In mapping the LDM to the hierarchical model, the modeling tool calculates row cardinality for each entity in the hierarchical model. The modeling tool also receives information on the various data types found in the LDM and, using this information, calculates attribute sizes for the entities in the hierarchical model.

Two other information sets 220, 230 that serve as input to the modeling tool provide models for each business application that will run against the database and for the database-implementation project phases. These models allow the DBA to view the critical links among the database information and business applications and the critical timings and resource limitations that ultimately govern the order in which implementation steps must occur.

The modeling tool 200 acts on these three information sets to produce output sets. One of these output sets 240 maps the information content of the database to the business applications that rely on that content. Another output set 250 maps the business applications to the various phases of the database-implementation project. As described below, the visual modeling tool creates a graphical display that delivers information from these output sets. This graphical display is interactive, allowing the DBA to alter one or more of its components to see how a change in the implementation process might affect the process overall. Among the information provided by the modeling tool in the graphical display are the storage-capacity requirements of the database throughout the implementation process; the complexity of sourcing data in view of the number entities and attributes involved; and the revenue-enhancement opportunities presented by various implementation plans.

Figure 3:
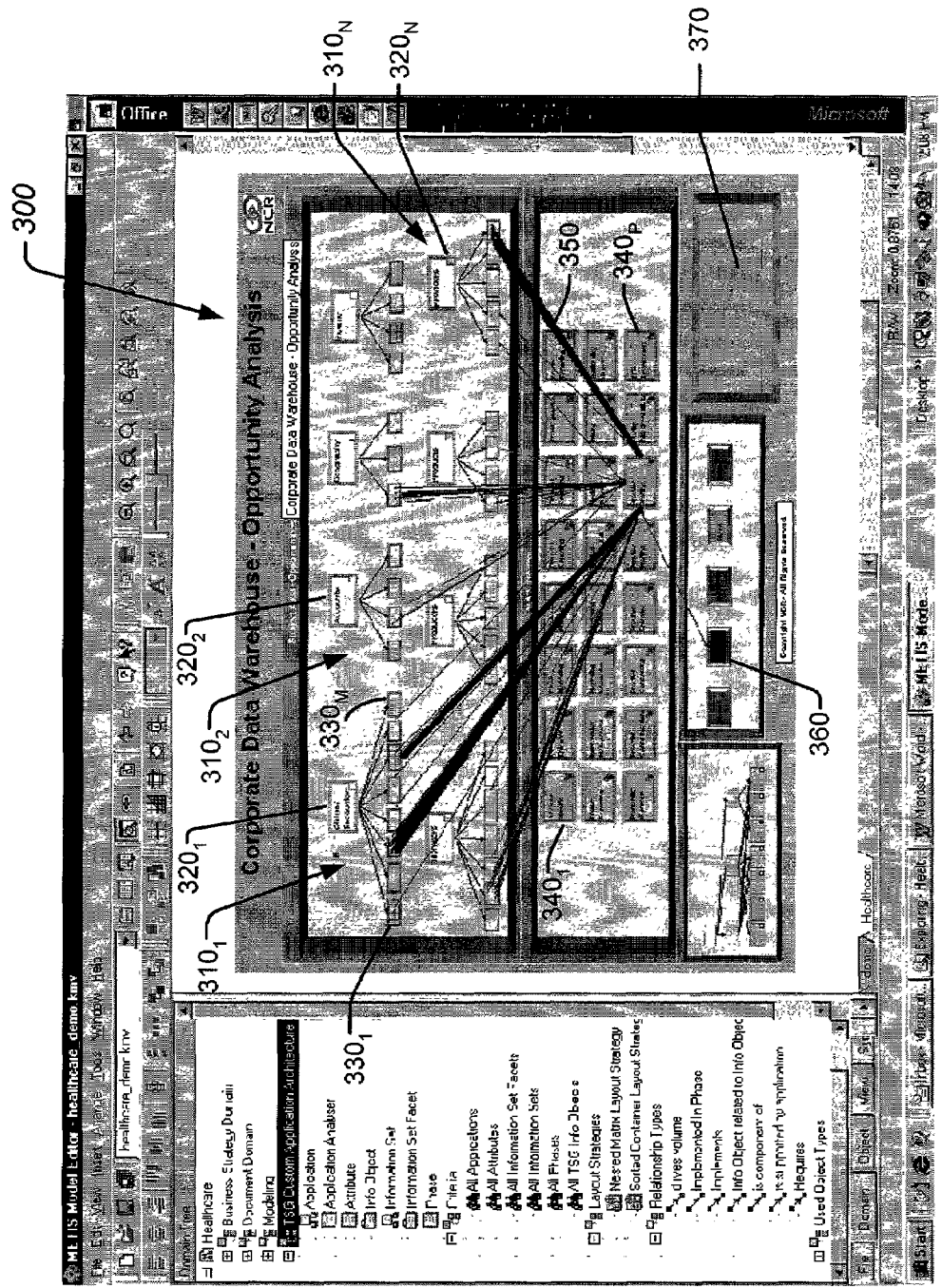
FIG. 3 is a visual model, produced by a visual-modeling tool, showing the relationships among data stored in a data warehouse and applications running against that data.

FIG. 3 shows one example of a graphical display, or visual model 300, produced by the visual-modeling tool. The visual model 300 includes objects arranged into one or more tree-like figures $310_{1 \ldots N}$ that represent the various subject areas $320_{2 \ldots N}$ into which the data falls and the various facets $330_{1 \ldots M}$ for each subject area. Lines in each tree-like figure connect the corresponding subject area $320_{1 \ldots N}$ to the facets $330_{1 \ldots M}$ that belong to it.

The visual model 300 also includes one or more objects $340_{1 \ldots P}$ that represent the database applications to be installed with the database. As described below, lines 350 connecting the application objects to the facet objects show relationships between the applications and the data to be stored in the database. The presence of a line between an application object and a facet object indicates that the application relies on the data stored in that facet object. The thicker the line, the stronger the application's dependence on the data in that facet. Displaying the relationships between applications and the logical data model in this manner helps the person implementing the data warehouse in deciding which portions of the database and which database applications should receive highest priority during database installation.

The visual modeling tool also helps the DBA to plan the phases in which the database and applications are implemented. The phases of the implementation process are represented in the model by phase objects 360 in the visual model 300. Lines connecting the phase objects to the application objects indicate the phase in which each of the applications is to be implemented. The tool calculates the "costs" for each phase based on data-storage requirements and information-sourcing requirements and displays cost information in a selected portion 370 of the visual model 300. The types of costs that the visual-modeling tool monitors include the following: (1) the database resources, or capacity, consumed by information objects stored in the database; and (2) the metrics used to estimate the amount of human time required to resolve an improvement opportunity. In capturing the capacity cost associated with a particular information object, the visual-modeling tool defines the database-table row-count and retention associated with the information object. The modeling tool also maps the relationships between the information object and any other database component (e.g., another information object) whose database-capacity requirement is driven by that information object. In capturing personnel costs, the modeling tool captures metrics used to estimate the number of person-days required to resolve a data-area opportunity within each information set facet. In some embodiments, the modeling tool also captures other types of cost information, such as the level of difficulty (e.g., "high," "medium," or "low") associated with implementing a database application or sourcing a facet.

The modeling tool retains information that indicates which content from the data model is involved in each phase and updates cost calculations accordingly when the DBA makes changes to the implementation strategy. The modeling tool does not "double count" a subject area or facet that is put into place in one phase and then used again (e.g., by an application) in a later phase.

Figure 4A:
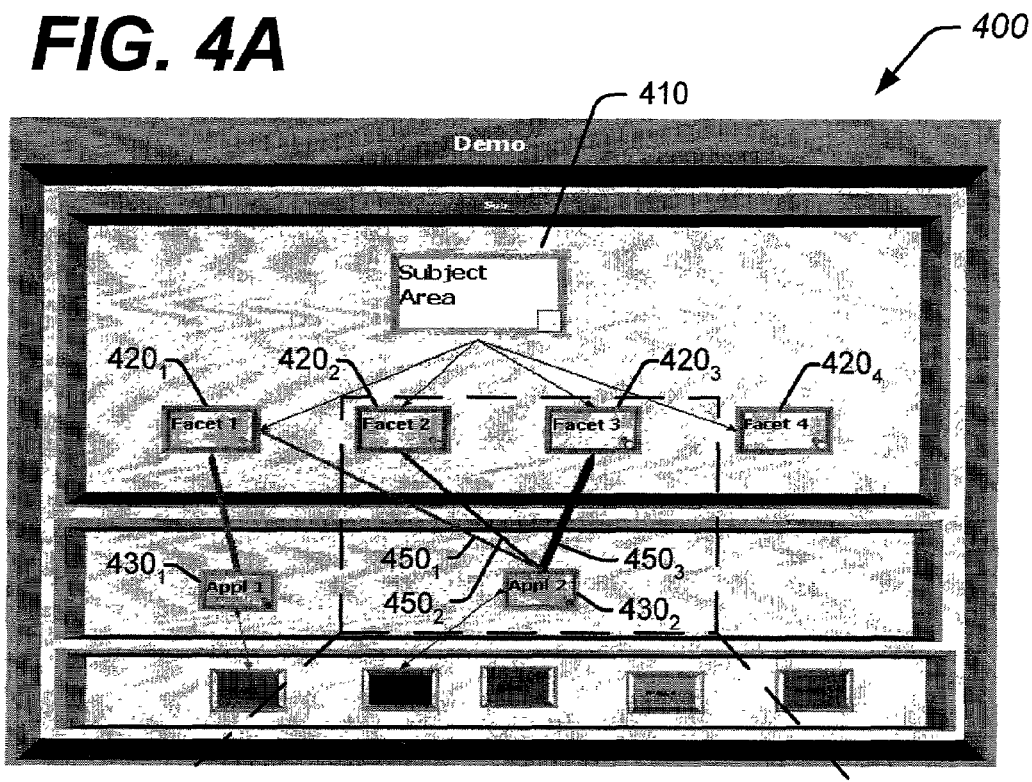
FIGS. 4A and 4B show a visual model in more detail.
Figure 4B:
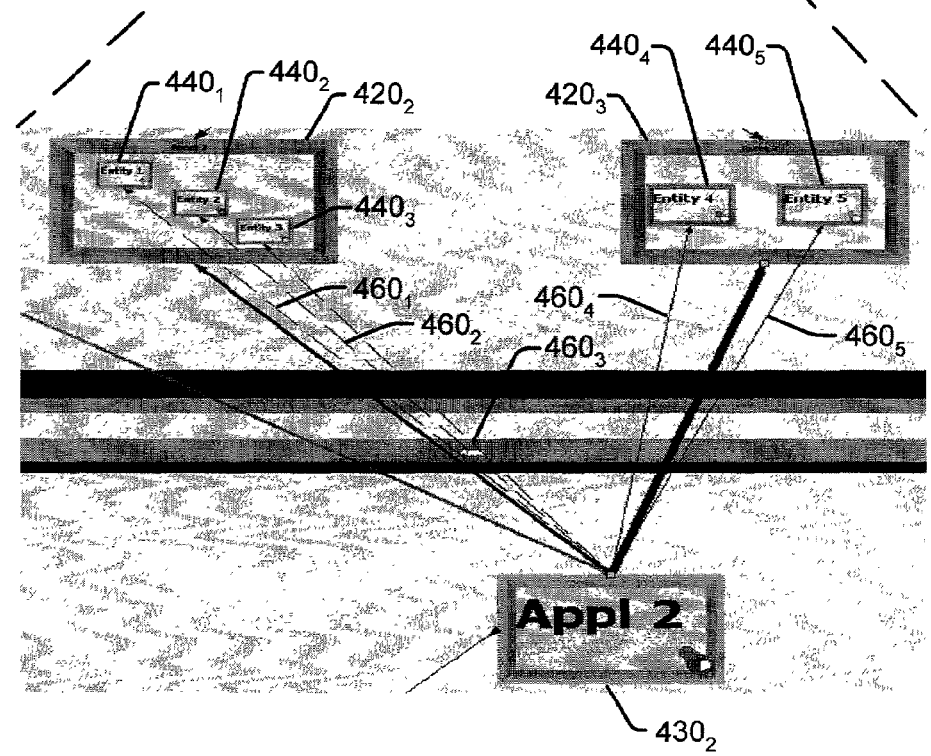

FIGS. 4A and 4B show in more detail a visual model 400 for a simple database or for some portion of a more complex database. This visual model 400 shows that, at the highest level, the database includes data falling into a particular subject area, represented by a "Subject Area" object 410 in the visual model 400. The visual model 400 also shows that this subject area includes four facets, each represented by one of four facet objects—a "Facet 1" object $420_1$, a "Facet 2" object $420_2$, a "Facet 3" object $420_3$, and a "Facet 4" object $420_4$.

The visual model 400 also includes two application objects that each represents a database application to be included in the database installation. The first of these applications, which is represented in the visual model by an "Appl 1" object $430_1$, relies on only one facet of the data in the subject area. The other application, which is represented by an "Appl 2" object $430_2$, relies on three of the four facets in the subject area. The relative thickness of the two lines $450_1, 450_2$ connecting the "Appl 2" object $430_2$ to the "Facet 1" and "Facet 2" objects $420_1, 420_2$ and the line $450_3$ connecting the "Appl 2" object $430_2$ to the "Facet 3" object $420_3$ shows that "Application 2" relies more heavily on "Facet 3" than it does on "Facet 1" and "Facet 2."

In FIG. 4B, the visual model shows the "Facet 2" and "Facet 3" objects, as well as the lines connecting these objects to the "Appl 2" object, in more detail. In particular, the visual model shows that the data in "Facet 2" falls into one of three entities, or information objects, each represented by one of three entity objects—an "Entity 1" object $440_1$, an "Entity 2" object $440_2$, and an "Entity 3" object $440_3$. Three dashed lines $460_1, 460_2, 460_3$ link these entity objects to the "Appl 2" object. These lines show that "Application 2" relies on all three entities of "Facet 2." The visual model also shows that the data in "Facet 3" falls into one of two entities, which are represented by an "Entity 4" object $440_4$ and an "Entity 5" object $440_5$. Two solid lines $460_4, 460_5$ link these entity objects to the "Appl 2" object to show that "Application 2" also implements both entities of "Facet 3."

In the detailed view of FIG. 4B, the two solid lines $460_4$, $460_5$ indicate that the relationship between "Application 2" and each of the two entities of "Facet 3" is "required," i.e., that "Application 2" must implement these entities in the database installation. The three dashed lines $460_1$, $460_2$, $460_3$ indicate that the relationship between "Application 2" and each of the three entities of "Facet 2" is "optional." The extent to which "Application 2" implements, or supports, each facet is determined by weighting the relationships between "Application 2" and each of the entities in the facet and averaging those weights to derive an "application/information-object support ratio," or "dependency index," between the application and information set object, or facet.

In this example, "optional" entities receive a weight of 0.5, and "required" entities receive a weight of 1.0. Therefore, the dependency index between "Application 2" and "Facet 2" (which has three entities, each with a weight of 0.5) is 50% [(0.5+0.5+0.5)/3=0.5]. The dependency index between "Application 2" and "Facet 3" (which has two entities, each with a weight of 1) is 100% [(1+1)/2=1].

In many embodiments, the lines linking application objects to facet objects are color coded to indicate the order in which implementation must occur. For example, the color blue might be used between the "Appl 2" object and the "Facet 2" and "Facet 3" objects to indicate that implementation of "Application 2" must occur before implementation of any other applications related to "Facet 2" and "Facet 3."

One technique for viewing additional detail in the visual model, such as cost information or hierarchical information like that shown in FIGS. 4A and 4B, is by using a pointing or tracking device, such as a mouse or track ball, to "select" the area-of-interest in the visual model, e.g., by placing a cursor over the area-of-interest and "double-clicking."

The listing below shows certain elements of an example metamodel created by the modeling tool. The terms in parentheses indicate whether the data contained in that portion of the metamodel is input by a human user or is derived by the modeling tool itself.

---

Objects (with properties)

Information Set (Subject Area)
Information Set Facet (Information Opportunity)
    Name
    Description
    Source Systems (Input)
    Facet Effort (Derived)
    Sourcing Difficulty (Input)
    Capacity[GB] (Derived)
    Time [Person Days] (Input)
    Phase (Derived)
    Count Supported Entities (Derived)
    Count Supported Attributes (Derived)
    Count Supported Applications (Derived)
Info Object (Information Object)
    Name
    Description
    Phase (Derived)
    Capacity (Derived)
    Row Length (Input or Derived)
    Row Count (Input or Derived)
    Retention (Input)
Attribute
    Name
    Description
    Type (Input)
    Size (Input)
    Decimal (Input)
    Primary Key (Input)
    Foreign Key (Input)

-continued

Calculated Size (Derived)
Application
    Name
    Description
    Phase (Derived)
    Implementation Readiness
    Business Impact
    Strategic Value (Derived)
    Application Effort
    Related Facet Effort (Derived)
    Total Sourcing Difficulty (Derived)
    Total Capacity (Derived)
    Total Time (Derived)
    Count Entities Used (Derived)
    Count of Facets Used (Derived)
Phase
Application Analyzer
Relationships Requires (from Application- to Info Object)
    Required/Optional (Input)
    Capacity (Derived)
    Phase (Derived)
    Connects Application Type (Derived)
    Application Relative Weighting (Derived)
    Capacity (Derived)
    Color (Derived)
    Required Line Style (Derived)
Implements (from Application - to Information Set Facet)
    Facet-Application Info Object Support % (Derived)
    Facet-Application Info Object Support Weight (Derived)
    Count total Info Objects supported by Facet (Derived)
    Application Entities/Facet Entities (Derived)
    Line Width (Derived)
    Sourcing Difficulty (Derived)
    Time (Derived)
    Phase (Derived)
    Color (Derived)
Drives Volume
    Multiplication Factor
    Derived Row Count
    Passed Row Count
    Implemented in Phase

---

Computer-Based and other Implementations

The various implementations of the invention are realized in electronic hardware, computer software, or combinations of these technologies. Most implementations include one or more computer programs executed by a programmable computer.

Figure 5:
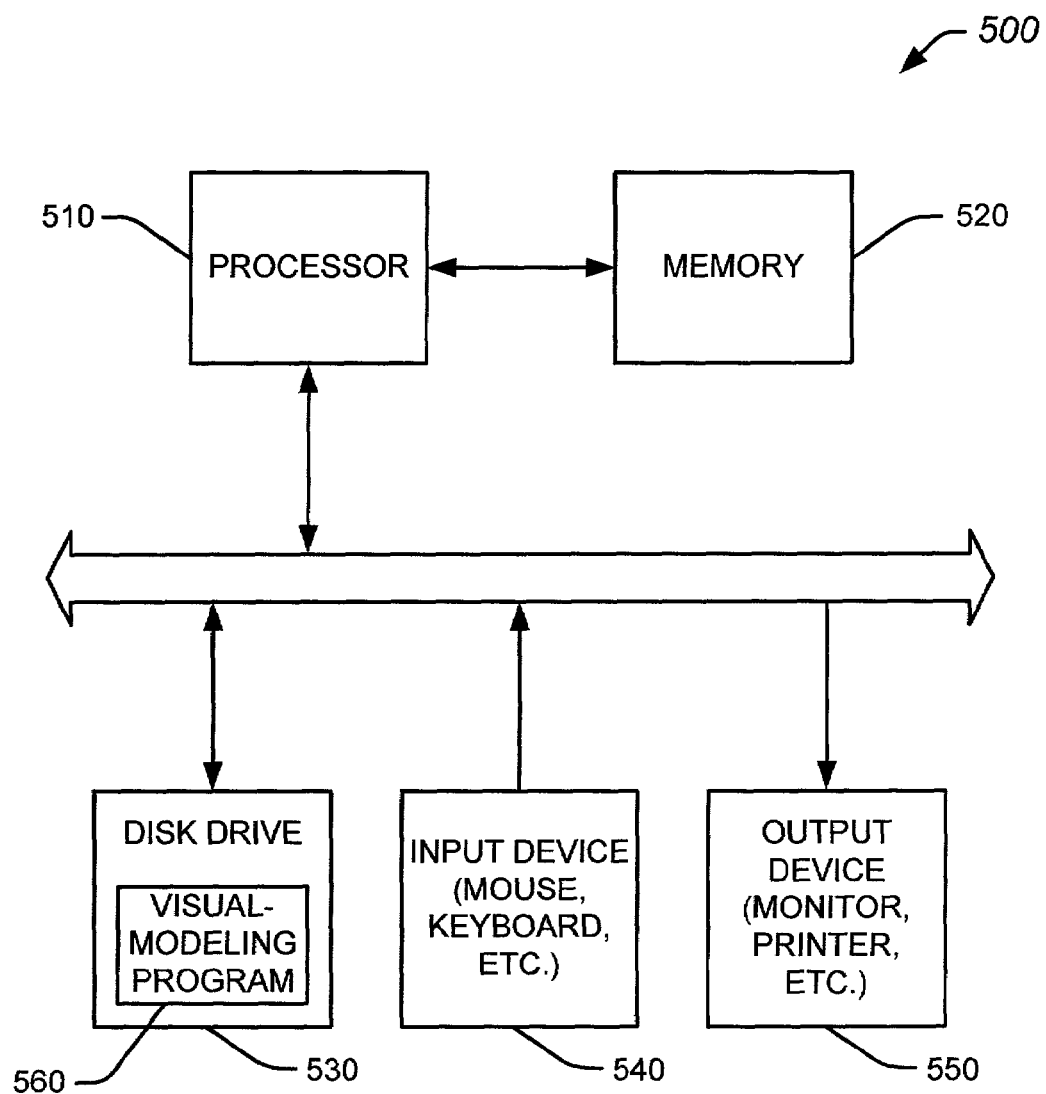
FIG. 5 is a schematic diagram of a programmable computer system that implements the visual-modeling tool.

FIG. 5 shows one such computer system 500. The computer includes one or more processors 510, one or more temporary storage components 520 (e.g., volatile and non-volatile memory modules), one or more persistent storage components 530 (e.g., optical and magnetic storage devices, such as hard and floppy disk drives, CD-ROM drives, and magnetic tape drives), one or more input devices 540 (e.g., mice and keyboards), and one or more output devices 550 (e.g., display consoles and printers).

The visual-modeling tool includes one or more executable computer programs 560 are usually stored in the persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of a broader invention. The invention also is carried out in a variety of alternative embodiments and thus is not limited to those described here. For example, in some embodiments, the modeling tool determines a schedule for database implementation based upon the relative importance of components to be implemented. Factors that might be considered in determining importance include the importance of each component (e.g., a database application) to the business of the entity that is building the database system; the number of applications required to resolve each opportunity for improvement; and the human and machine effort required to resolve the opportunity.

In some embodiments, the modeling tool also analyzes the importance of certain implementation steps from the perspective of the database applications and the implementation phases. For example, in many embodiments the modeling tool calculates how relevant, or important, the opportunity for improvement in a particular data subject area is for each of the database applications at each implementation phase. The modeling tool also allows monitoring the total resource capacity and human effort required for each application in resolving opportunities for improvement. The tool also allows the monitoring of aggregated costs by implementation phase.

Many other embodiments are also within the scope of the following claims.

We claim:

1. A computer-implemented method for use in constructing a database, the method comprising:
   gathering information about data that will form the content of the database;
   gathering information about one or more applications that will access the database;
   gathering information about one or more project phases in which the database will be constructed;
   using the gathered data to:
      create a model explaining relationships among the content of the database, the applications that will access the database, and the project phases in which the database will be constructed; and
      calculate costs for construction of the database; and
      presenting the model and the calculated costs to a human administrator through a computer-generated graphical display.

2. The method of claim 1, where creating a model of relationships includes creating a map that links applications to the project phases in which those applications are to be implemented.

3. The method of claim 1, where creating a model of relationships includes creating a map that links applications to the project phases in which those applications are to be implemented.

4. The method of claim 1, where calculating costs includes calculating an amount of database resources needed to implement the database system.

5. The method of claim 1, where calculating costs includes calculating an amount of human resources needed to implement the database system.

6. The method of claim 1, where calculating costs includes calculating costs for each project phase.

7. The method of claim 1, also including a step of allowing a human user to modify the graphical display to effect changes in one or more project phases.

8. The method of claim 7, also including a step of revising the model of relationships among the content, applications, and phases in response to changes in the one or more project phases.

9. The method of claim 7, also including a step of recalculating the costs for construction of the database in response to changes made by the user.

10. The method of claim 1, where gathering information about the data that will form the content of the database includes deriving information from a database model that defines a logical structure for the data in the database.

11. A visual modeling tool for use constructing a database system, the tool comprising computer-readable instructions stored on a tangible storage medium that, when executed by a computer system, cause the system to:
    gather information about data that will form the content of the database;
    gather information about one or more applications that will access the database;
    gather information about one or more phases in which the database will be constructed;
    use the gathered information to:
       create a model or diagram explaining relationships among the content of the database, the applications that will access the database, and the project phases in which the database will be constructed; and
       calculate costs for construction of the database; and
    present the model and the calculated to a human administrator through a graphical display.

12. The tool of claim 11, where, in creating a model of relationships, the computer system creates a map that links the database content to the applications that rely on that content.

13. The tool of claim 11, where, in creating a model of relationships, the computer system creates a map that links applications to the project phases in which those applications are to be implemented.

14. The tool of claim 11, where, in calculating costs, the computer system calculates an amount of database resources needed to implement the database system.

15. The tool of claim 11, where, in calculating costs, the computer system calculates an amount of human resources needed to implement the database system.

16. The tool of claim 11, where, in calculating costs, the computer system calculates costs for each project phase.

17. The tool of claim 11, where the computer system also allows a human user to modify the graphical display to effect changes in the one or more project phases.

18. The tool of claim 17, where the computer system revises the model of relationships among the content, applications, and phases in response to changes made by the user.

19. The tool of claim 17, where the computer system recalculates costs for the implementation project in response to changes made by the user.

20. The tool of claim 11, where, in gathering information about the data that will form the content of the database, the computer system derives information from a data model that defines a logical structure for the data in the database.

* * * * *